United States Patent
Torbov et al.

(10) Patent No.: US 8,375,872 B2
(45) Date of Patent: Feb. 19, 2013

(54) PROCESS FOR REDUCTION OF SULFUR COMPOUNDS AND NITROGEN COMPOUNDS IN THE EXHAUST GASES OF COMBUSTION DEVICES

(75) Inventors: T. Steve Torbov, San Jose, CA (US); Terry W. Rettig, Los Altos, CA (US); Stephen M. Kohan, Los Altos, CA (US)

(73) Assignee: Intertek APTECH, Sunnyvale, CA (US)

( * ) Notice: Subject to any disclaimer, the term of this patent is extended or adjusted under 35 U.S.C. 154(b) by 0 days.

(21) Appl. No.: 12/072,005

(22) Filed: Feb. 21, 2008

(65) Prior Publication Data

US 2008/0202397 A1    Aug. 28, 2008

Related U.S. Application Data

(60) Provisional application No. 60/903,279, filed on Feb. 23, 2007.

(51) Int. Cl.
*F23N 5/02* (2006.01)
*F23J 15/02* (2006.01)
*G05D 11/16* (2006.01)

(52) U.S. Cl. ........ 110/190; 110/215; 110/216; 110/297; 110/345; 110/348; 423/235; 700/283

(58) Field of Classification Search .................. 110/185, 110/190, 204, 207, 215, 345; 423/235; 700/283
See application file for complete search history.

(56) References Cited

U.S. PATENT DOCUMENTS

| | | | |
|---|---|---|---|
| 3,246,635 A | 4/1966 | Powell et al. | 122/479.1 |
| 4,056,068 A | 11/1977 | Hafeli | 110/345 |
| 4,223,640 A | 9/1980 | Rochford et al. | 122/1 R |
| 4,261,037 A | 4/1981 | Hicks | 364/464 |
| 4,411,204 A | 10/1983 | Hamilton | 110/347 |
| 4,498,402 A | 2/1985 | Kober et al. | 110/345 |
| 4,555,996 A * | 12/1985 | Torbov et al. | 110/345 |
| 4,613,952 A | 9/1986 | McClanahan | 364/578 |
| 4,616,574 A | 10/1986 | Abrams et al. | 110/343 |
| 4,642,225 A | 2/1987 | Leikert | 423/244.06 |
| 4,655,148 A * | 4/1987 | Winship | 110/347 |
| 4,710,365 A | 12/1987 | Gebhard et al. | 423/244 |
| 4,722,287 A * | 2/1988 | Anderson et al. | 110/263 |
| 4,779,545 A | 10/1988 | Breen et al. | 110/212 |
| 4,796,548 A | 1/1989 | Merrell et al. | 110/343 |
| 4,873,930 A | 10/1989 | Egense et al. | 110/345 |
| 4,960,577 A | 10/1990 | Torbov et al. | 423/242 |
| 5,042,404 A | 8/1991 | Booth et al. | 110/347 |
| 5,284,637 A | 2/1994 | Merritt et al. | 423/244.07 |
| 5,309,850 A | 5/1994 | Downs et al. | 110/235 |
| 5,313,895 A | 5/1994 | Sekiguchi et al. | 110/346 |
| 5,570,644 A * | 11/1996 | Cheng | 110/215 |
| 5,615,953 A * | 4/1997 | Moskal | 374/7 |
| 5,658,540 A * | 8/1997 | Valentino | 423/210 |

(Continued)

OTHER PUBLICATIONS

Aptech Engineering Services, Inc., Costcom Demo, http://www.costcom.com, Apr. 2001, and 2 pages.

(Continued)

*Primary Examiner* — Kenneth Rinehart
*Assistant Examiner* — David J Laux
(74) *Attorney, Agent, or Firm* — Haverstock & Owens LLP (57) ABSTRACT

The present invention is directed to processes and apparatuses for reducing the content of pollutants in a boiler system flue gas resulting from combustion of fuel. The present invention discloses improved slurry injection techniques, re-circulation of flue gas to provide momentum to the injected slurry, a measurement system for obtaining system profile information and a system to optimize the reduction of pollutants in a flue gas by adjusting the injection of slurry suspension based on system profile information.

45 Claims, 8 Drawing Sheets

U.S. PATENT DOCUMENTS

| | | | | |
|---|---|---|---|---|
| 5,683,550 | A | | 11/1997 | Ryham ................ 162/30.1 |
| 5,685,243 | A | * | 11/1997 | Gohara et al. ............. 110/345 |
| 5,695,723 | A | * | 12/1997 | Valentino .................. 422/177 |
| 5,746,144 | A | * | 5/1998 | Breen et al. ............... 110/345 |
| 5,967,061 | A | * | 10/1999 | Ashworth et al. .......... 110/203 |
| 6,213,032 | B1 | * | 4/2001 | Breen et al. ............... 110/345 |
| 6,280,695 | B1 | | 8/2001 | Lissianski et al. ....... 423/239.1 |
| 6,289,666 | B1 | * | 9/2001 | Ginter ........................ 60/775 |
| 6,430,914 | B1 | | 8/2002 | Goidich et al. ............ 60/39.02 |
| 6,722,295 | B2 | * | 4/2004 | Zauderer .................... 110/345 |
| 6,883,443 | B2 | * | 4/2005 | Rettig et al. ............... 110/343 |
| 2004/0120874 | A1 | | 6/2004 | Zauderer .................. 423/242.1 |
| 2006/0191451 | A1 | * | 8/2006 | Jia et al. ..................... 110/345 |

OTHER PUBLICATIONS

Lefton et al., "The real cost of cycling powerplants: What you don't know will hurt you", Power Magazine, Nov./Dec. 2002, and 5 pages.

"Structural Material Anomaly Detection System Using Water Chemistry Data", Yamato Asakura, Makoto Nagase, Shunsuke Uchida, Energy Research Laboratory, Hitachi, Ltd., Katsumi Ohsumi, Hitachi Works, Hitachi Ltd. Journal of Nuclear Science and Technology, vol. 29, No. 11, Nov. 1992, pp. 76-82.

R. C. Booth, B. P. Breen, C.A. Gallaer and R. W. Glickert "Natural Gas/Pulverized Coal Cofiring Performance Testing at an Electric Utility Boiler", *Gas Researach Institute Topical Report* (Jun.-Oct. 1986) Jun. 1987.

"Natural Gas Cofiring for Coal Boilers", *Gas Research Institute Technology Profile* Sep. 1987.

Jason Makansi, "Cofiring Gas: Cure for Ailing Powerplants?", *Power*, pp. 19-20, Sep. 1989.

J. M. Pratapas, "Extended Development of Gas Cofiring to Reduce Sulfur Dioxide and Nitric Oxide Emissions From a Tangentially Coal-Fired Utility Boiler", *Topical Report* Aug. 1987-Feb. 1988, Gas Research Institute, Aug. 1988.

* cited by examiner

PROCESS FOR REDUCTION OF SULFUR COMPOUNDS AND NITROGEN COMPOUNDS IN THE EXHAUST GASES OF COMBUSTION DEVICES

RELATED APPLICATIONS

This Patent Application claims priority under 35 U.S.C. §119 (e) of the U.S. Provisional Patent Application, Ser. No. 60/903,279, filed Feb. 23, 2007, and entitled, "PROCESS FOR REDUCTION OF SULFUR COMPOUNDS AND NITROGEN COMPOUNDS IN THE EXHAUST GASES OF COMBUSTION DEVICES". The Provisional Patent Application, Ser. No. 60/903,279, filed Feb. 23, 2007, and entitled, "PROCESS FOR REDUCTION OF SULFUR COMPOUNDS AND NITROGEN COMPOUNDS IN THE EXHAUST GASES OF COMBUSTION DEVICES" is also hereby incorporated by reference in its entirety.

FIELD OF THE INVENTION

The present invention relates generally to the field of power plant operation. More specifically, the present invention relates to the field of reducing pollutant compounds to acceptable levels in the exhaust gases of combustion devices.

BACKGROUND OF THE INVENTION

The combustion of fossil fuels contribute to air pollution. Gaseous compounds and other pollutants existing in flue gas are a result of the combustion of fuel containing such compounds. For example, the combustion of fossil fuels containing sulfur and organically-bound nitrogen and also from the combustion of air nitrogen produce emitted flue gas having sulfur-containing and nitrogen-containing compounds, in particular, oxides of sulfur (hereinafter "$SO_X$") and oxides of nitrogen (hereinafter "$NO_X$"). For environmental and regulatory reasons, these pollutant compounds must be controlled to regulated levels in the flue gas before gas is allowed to be released to the environment.

Various methods of removing such compounds from a flue gas exist which provide various degrees efficacy, efficiency and cost. One method of removing compounds of sulfur are disclosed in U.S. Pat. No. 4,555,996, which issued on Dec. 3, 1985, and entitled "METHOD FOR REDUCTION OF SULFUR PRODUCTS IN THE EXHAUST GASES OF A COMBUSTION CHAMBER". Another method of removing compounds of nitrogen are disclosed in U.S. Pat. No. 4,325,924, which issued on Apr. 20, 1982, and entitled "UREA REDUCTION OF $NO_X$ IN FUEL RICH COMBUSTION EFFLUENTS". These methods contemplate introducing additives to the flue gas to reduce resultant pollution. There exists a need for more control of the introduction of additives in the flue gas.

One problem facing the removal of pollutants from a flue gas by injecting reactive sorbent into a chamber is the need for precise control over the temperature of the sorbent at the point of reaction with the pollutants. Injecting dry sorbent which reacts with $SO_X$ and $NO_X$ is problematic because the boiler chambers which produce these pollutants are extremely hot and cause the sorbent to partially melt and sinter before any effective removal can take place. This has led to using water to deliver the sorbent in the form of a water slurry.

It has been shown that injecting a slurry instead of a dry sorbent results in better performance. The slurry typically comprises a suspension of a sorbent within a liquid. By utilizing a slurry, the boiler heats up the suspension and boils off the liquid before it can melt the sorbent. By selecting an appropriate slurry mixture the sorbent is given additional time to travel towards the desired locations within the boiler before the liquid is all boiled off, thus preventing melting of the sorbent.

Nevertheless, it is still oftentimes difficult to deliver the appropriate amount of sorbent at the appropriate temperature to the appropriate locations in the boiler. Optimal pollutant-reduction reactions (i.e. sulftation, calcination and similar reactions) occur at certain thermal conditions. Many industrial boilers are designed with convective heat transfer surfaces located where these conditions occur. However, known injection methods cannot adequately deliver slurry into the boiler such that the right mixture of slurry is delivered to these locations where optimal reactions are able to occur, and cannot evenly distribute slurry into the main gas flow.

Another problem facing traditional pollutant removal practices is the amount of power needed to run the removal equipment, which can be quite expensive to operate. For instance, using scrubbers to reduce $SO_X$ and $NO_X$ emissions requires an expensive infrastructure. Additionally, the power needed to run such infrastructure is very large in comparison to the amount of power generated by the system. As such, traditional pollutant removal methods are parasitic in the sense that they consume a significant portion of the very power the system is meant to produce. Such a method of reducing $SO_X$ and $NO_X$ emissions using scrubbers causes the system to produce significantly more $CO_2$ and greenhouse gas emissions due to its parasitic nature. Furthermore, these scrubbers are very expensive, take up a great deal of space and take a long time to assemble. What is needed is an apparatus and process for reduction of pollutants in combustion devices which does not require a high degree of parasitic power usage and has a relatively low cost.

SUMMARY OF THE INVENTION

The present invention is directed to processes and apparatuses for reducing the content of pollutants in a boiler system flue gas resulting from the consumption of fuel. The present invention discloses improved slurry injection techniques and a measurement system for obtaining system profile information. In some embodiments of the present invention, the system profile includes a pollutant concentration measurement across a cross section of a furnace. In other embodiments, the system profile is a temperature profile of a cross section of the furnace. In yet other embodiments, the system profile is a pressure profile of a cross section of the furnace. Although specific examples of types of profiles are disclosed, it will be readily apparent to those having ordinary skill in the art that many attributes of a furnace are able to observed as a system profile. Using the system profile information, the concentration of the slurry and the injection of the slurry is adjusted to improve the resulting system profile. In some embodiments of the present invention, a novel system for the injection of sorbent into a boiler is utilized. According to these embodiments, momentum-providing re-circulated flue gas, air or any similar gas is pumped into the boiler with the slurry to provide momentum to the injected slurry such that the injected slurry is evenly distributed and is able to reach desired regions of the boiler. In some embodiments of the present invention, re-circulated flue gas is used to aid the injection process and provide additional momentum. In some embodiments of the present invention, the various components of the system are controlled by a computer. In some embodiments of the present invention the computer controls the flow rate of slurry, direction of injection, concentration of slurry, and flow rate of the re-circulated flue gas and the computer dynamically adjusts the components to optimize the reduction of pollutants in the flue gas.

DETAILED DESCRIPTION OF THE INVENTION

Improved techniques are used for injecting, mixing and distributing additives into a boiler. A novel measurement system is used for the introduction of additives into the flue gas stream. When practiced together these techniques produce synergistic results. Those of ordinary skill in the art will realize that the following detailed description of the present invention is illustrative only and is not intended to limit the claimed invention. Other embodiments of the present invention will readily suggest themselves to such skilled persons having the benefit of this disclosure. It will be appreciated that in the development of any such actual implementation, numerous implementation-specific decisions must be made in order to achieve the developer's specific goals. Reference will now be made in detail to implementations of the present invention as illustrated in the accompanying drawings. The same reference indicators will be used throughout the drawings and the following detailed description to refer to the same or like parts.

Figure 1:
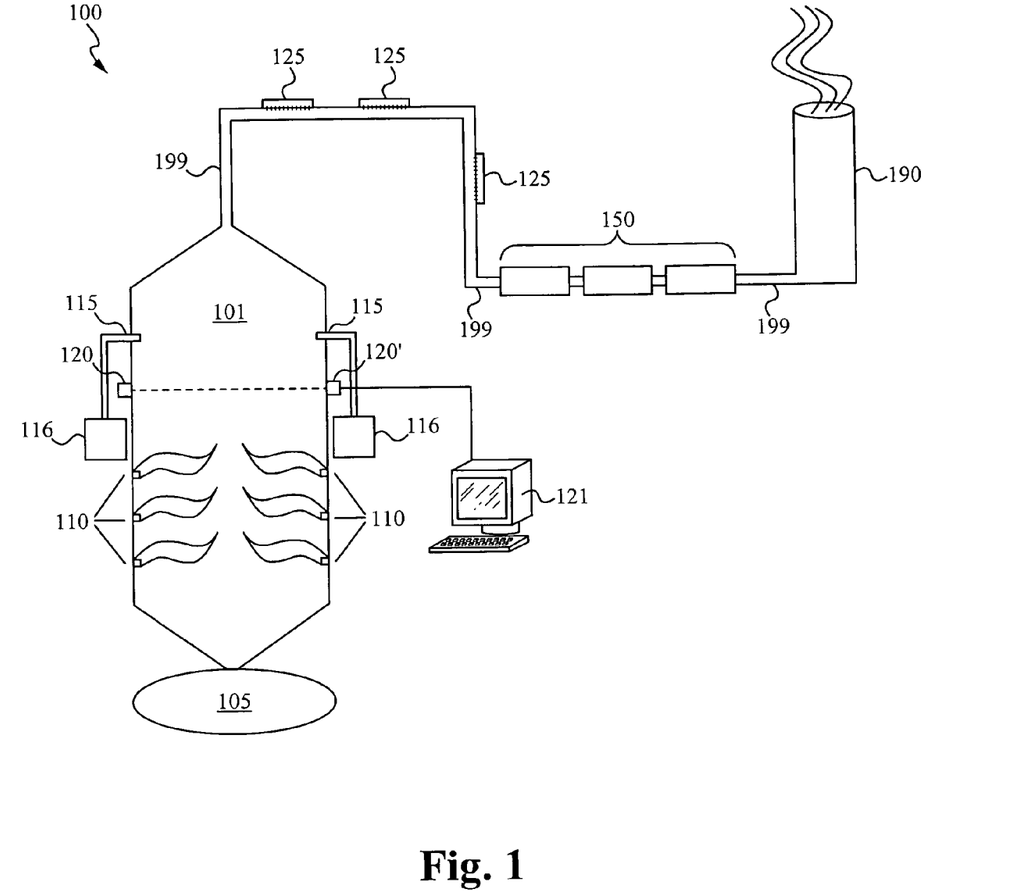
FIG. 1 illustrates a schematic side view of a boiler system utilizing a measurement system for obtaining a temperature profile of the boiler furnace according to some embodiments of the present invention.

FIG. 1 shows a side view of a boiler system 100 with fuel source 105, boiler furnace 101, burners 110, sorbent source 116, injectors 115, measuring devices 120, 120', heat transfer surfaces 125, particulate control devices 150, duct work 199 and stack 190. In some embodiments of the present invention, an atomizer is used as the injector 115, although those having ordinary skill in the art will appreciate that any other suitable injector 115 is similarly envisioned. The particulate control devices 150 include, but are not limited to bag houses, electrostatic precipitators, or the like. In some other embodiments of the present invention, the injectors 115 are positioned in the convective pass of the boiler system 100.

As the burners 110 consume fuel from the fuel source 105, flue gas (not shown) is formed. The consumption of the fuel also releases pollutants (not shown) into the flue gas. The boiler system 100 is designed to reduce the amount of pollutants in the flue gas by injecting additives (not shown) from a source 116 through injectors 115 into the boiler furnace 101. The additives are substantially uniformly distributed throughout a distribution of pollutants and react chemically with the pollutants. Given the proper thermal conditions the additives react with the pollutants to form a new particulate capable of being removed from the flue gas by the particulate control devices 150.

In some embodiments of the present invention, a solid fuel source 105 is used. In other embodiments of the present invention, a gaseous or liquid fuel source 105 is used. In some embodiments of the present invention a carbon-containing fuel source 105 is selected. In yet other embodiments of the present invention a municipal solid waste fuel source 105 is selected.

In some embodiments, the injected additives comprise a slurry including a suspension of a sorbent mixed with a liquid. In some embodiments, the suspension is a suspension of water and basic nitrogen-containing compounds. Preferably, the suspension is a suspension of water and urea solution. In some embodiments of the present invention, the suspension is further stabilized with surfactants.

The sorbent is chosen for its tendency to react with a chosen pollutant and its ability to create a particulate from the reaction. Such particles are capable of being cleaned from the flue gas by the particulate control devices 150. In some embodiments the sorbent is chosen for its ability to control emissions of sulfur, including, but not limited to: lime, limestone dolomite and other similar calcium based and magnesium based salts known to react with sulfur oxides to form sulfates or sulfites. In some embodiments the sorbent is chosen for its ability to control emissions of nitrogen oxides, including, but not limited to: urea, ammonia, aqueous ammonia, and amine-based additives. In some embodiments, activated charred carbon, limestone or other sorbents are used as a sorbent for its ability to react with mercury. It will be apparent that combinations of these sorbents can be used to simultaneously remove more than one pollutant. In some embodiments, additional additives in the slurry are injected into the boiler furnace 101 for the following purposes: slurry stabilization, control of surface tension, control of oxidation, control of slurry viscosity, among others. In some embodiments of the present invention, the size distribution of the particles used in the slurry suspension is adjusted.

The slurry urea suspension mixes with the pollutants as the flue gas rises, forming a flue gas-slurry mixture (not shown), which is forced through the duct work 199. The heat transfer surfaces 125 provide the flue gas-slurry suspension mixture with appropriate temperature conditions such that the desired reaction occurs between the slurry suspension and the flue gas to form particulates which can filter out the pollutants.

In some embodiments of the present invention, a Ca—Mg sorbent/urea slurry/suspension is injected into the furnace of the combustion chamber where it is possible to premix the slurry/suspension with the flue gas containing the $SO_X$ and $NO_X$, allowing proper mixing of the sorbent with the flue gas.

It is also an object of the present invention to provide a means for optimizing the temperature of the flue gas-slurry mixture such that the mixture reaches the heat transfer surfaces 125 under ideal conditions. To achieve such a result, a temperature profile of the boiler furnace is used to adjust the injection of the slurry based on the temperature profile. The measuring device 120, 120' measures the temperature across the cross section of the boiler furnace 101. In some embodiments of the present invention, more than one measuring device is used to measure the temperature of the boiler across more than cross section. After the temperature profile of the boiler furnace 101 is known, the injection of slurry into the boiler furnace 101 is able to be optimized such that it reaches the heat transfer surfaces 125 under appropriate conditions. In some embodiments of the present invention, a laser is utilized as the measuring device 120, 120' and laser spectroscopy techniques are utilized to measure the temperature gradient.

Another object of the invention is to provide a means for delivering the appropriate amount of slurry to the boiler furnace 101 based on the relative concentration of pollutants over a cross section of the boiler furnace 101. To deliver the appropriate amounts of slurry, a pollutant concentration profile is taken. According to this embodiment, the measuring device 120, 120' is utilized to measure the level of concentration of pollutants. In some embodiments of the present invention, a laser is utilized as the measuring device 120, 120' and laser spectroscopy techniques are utilized to measure the pollutant concentration gradient. Once a concentration profile is known, the injection of slurry is able to be optimized such that an appropriate amount of slurry reaches particular points in the boiler furnace 101, based on the concentration profile. In other embodiments of the present invention, temperature profiles are taken and the injection of slurry solution is altered in response to the temperature profile.

After a temperature profile or a concentration profile of the boiler furnace are known, there are a number of ways to optimize the injection of slurry into the boiler furnace 101 in order to ensure proper temperature of slurry as it interacts with the flue gas or to ensure that an appropriate amount of slurry is injected across the boiler furnace to follow the concentration profile. In some embodiments of the present invention both a temperature profile and a pollution concentration profile are obtained to ensure that both goals are achieved.

First, adjusting the angle of injection of slurry when tangentially injected in a tangentially fired combustion chamber ensures that the flue gas-slurry mixture has the proper temperature for optimal reaction conditions and pollutant reduction. As slurry is injected into the boiler furnace 101, the liquid supporting the sorbent is heated and experiences a phase shift. When the liquid boils off, the sorbent itself can begin to melt if the temperature is high enough, rendering it less useful in pollutant reactions. Therefore, by adjusting the angle of the injection of the slurry, one is able to control where the slurry will first be introduced and where the slurry will first begin to heat up and is also able to control how long the slurry mixture will be heated before reaching the right temperature window. As such, by adjusting the angle of injection based on the temperature profile of the boiler furnace 101, the flue gas slurry mixture is maintained under optimal temperature conditions upon reaching the right temperature window for the reactions, leading to reduction of the $SO_x$ in the flue gas.

In some embodiments of the present invention, the flue gas containing particles is further cleaned using scrubbers.

Figure 2A:
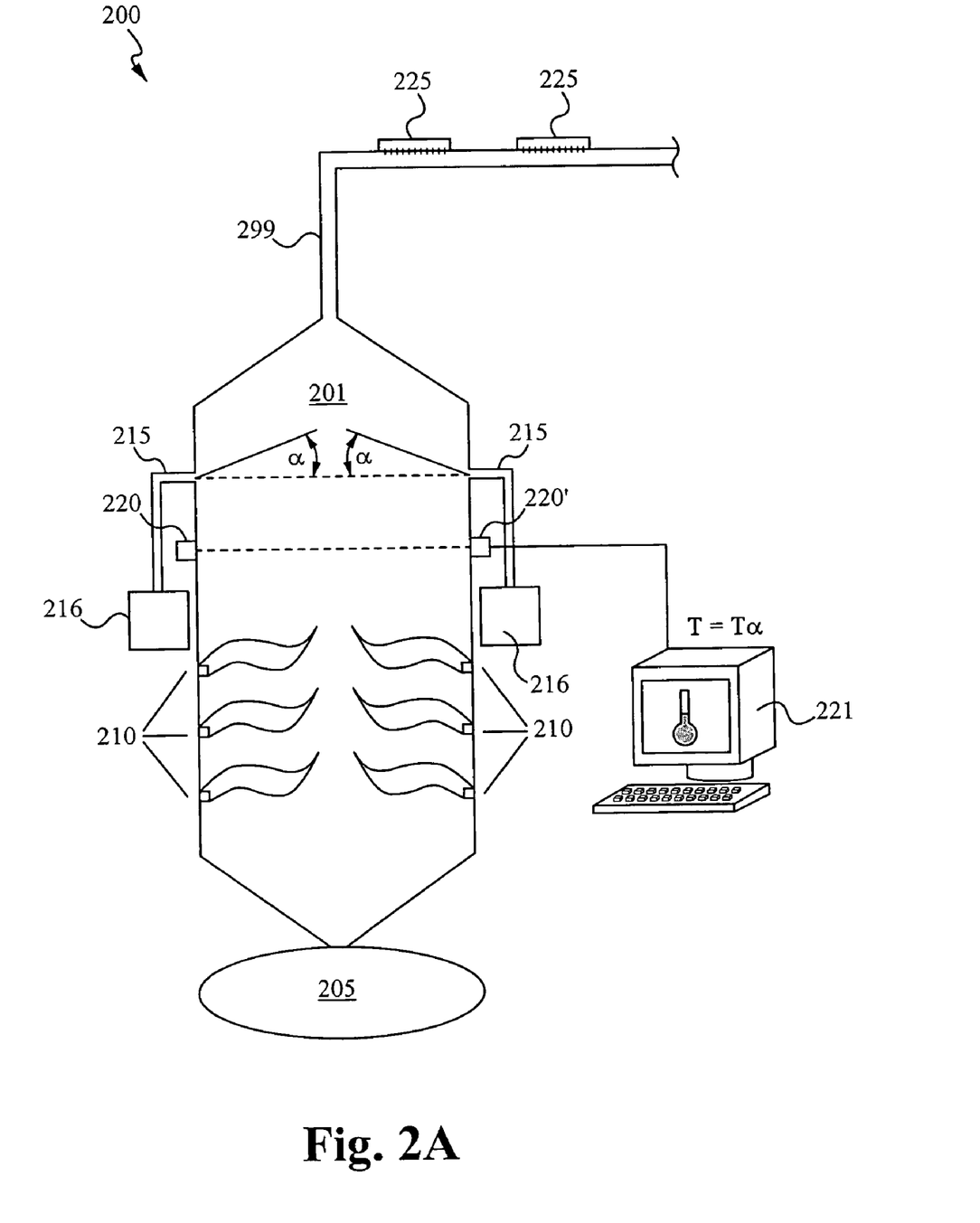
FIG. 2A illustrates a schematic side view of a boiler system having a measurement system report a temperature profile $T=T\alpha$ and an injector injecting sorbent at an angle $\alpha$ according to some embodiments of the present invention.
Figure 2B:
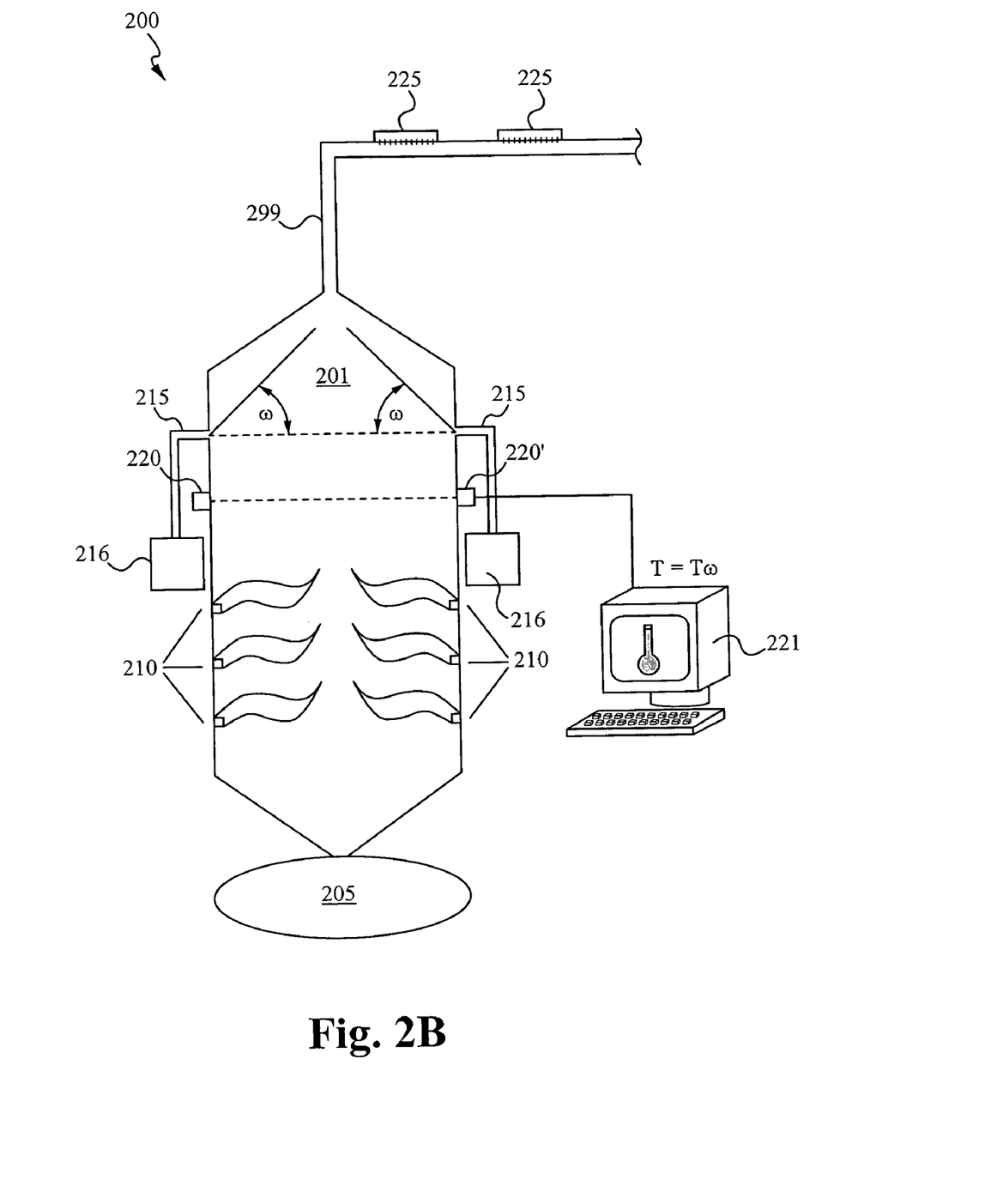
FIG. 2B illustrates a schematic side view of a boiler system having a measurement system report a temperature profile $T=T\omega$ and an injector injecting sorbent at an angle $\omega$ according to some embodiments of the present invention.

FIGS. 2A and 2B illustrate how the angle of slurry injection can be changed to optimize the temperature of the slurry suspension mixture. FIG. 2A shows a side view of a boiler system 200 with fuel source 205, boiler furnace 201, burners 210, sorbent source 116, slurry injectors 215, measuring device 220, 220', duct work 299 and heat transfer surfaces 225. Furthermore, the measuring device 220, 220' are coupled to a computer 221. The measuring device 220, 220' measures the temperature of the boiler furnace 201. As shown in FIG. 2A, the temperature profile information taken from the measuring device 220, 220' is displayed on the computer 221, as $T=T\alpha$. FIG. 2A also shows the injection of the slurry from the injectors 215 at angle α. As the slurry is injected into the boiler furnace 201, it mixes with flue gas (not shown) and is directed through the duct work 299 toward the heat exchange surface 225. This angle α represents the angle in which slurry is injected into the boiler furnace 201 in order to arrive at heat exchange surface 225 at optimal conditions.

FIG. 2B illustrates the same system wherein the optimal temperature conditions for heat exchange remain the same as in FIG. 2A. However, the boiler furnace 201 has a temperature profile $T=T\omega$, where $T\omega>T\alpha$. As such, the heat from the boiler furnace 201 will heat up the injected slurry more quickly. To deliver slurry mixture to the optimal conditions, the slurry is not exposed to the heat from the boiler furnace 201 for as long a time. To achieve this result, the angle at which the slurry is injected into the boiler furnace 201 is increased. As shown, the angle at which the slurry is injected is ω, where $\omega>\alpha$.

In some embodiments of the present invention, the angle of injection is manually adjusted. In other embodiments of the present invention, the angle of injection is adjusted by adjusting the amount and orientation of momentum-providing gas used to provide momentum to the injected slurry (explained below). In some embodiments of the present invention, the injectors 215 are coupled to the computer 221, the angle of the injection is controlled by the computer 221 and the system is automated. According to this embodiment, the measuring device 220, 220' reports to the computer 221 as the temperature profile of the boiler furnace 201 changes. The computer 221 relays this information to the injector and the angle of the injector 215 dynamically adjusts, in real time, to optimize the temperature conditions of the slurry mixture. In some embodiments of the present invention, more than one measuring device 220, 220' is utilized to deliver a more precise temperature profile and one or more pollutant concentration profile.

Figure 3:
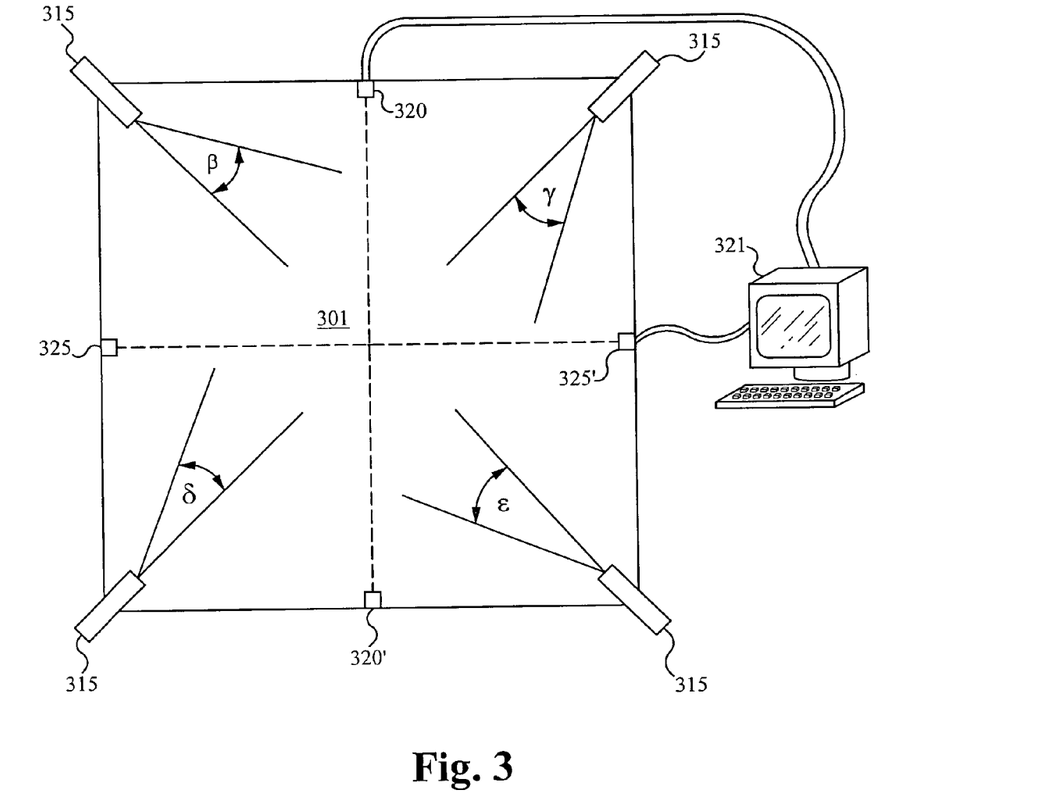
FIG. 3 illustrates a schematic top view of a boiler system having corner fired injectors injecting sorbent at different angles according to some embodiments of the present invention.

Next, adjusting the planar angle of injection can be utilized to ensure that an appropriate amount of slurry is injected across the boiler furnace to follow the pollutant concentration profile. FIG. 3 provides a top view of the boiler furnace 301 with injectors 315 mounted in the corners of the boiler furnace. Also shown are measuring devices 320, 320', 325, 325' situated along the walls of the boiler furnace 301 in order to measure pollutant concentration. Although two measuring devices 320, 320' and 325, 325' are shown, any number of measuring devices can be used to measure concentration, including one measuring device. An advantage of using two measuring devices rather than one is that using a pair of devices allows a two-dimensional profile, resulting in more accuracy. In some embodiments of the present invention, the measuring devices 320, 320', 325, 325' are lasers and corresponding targets, and laser spectroscopy techniques are used to produce a pollutant concentration profile.

After a pollutant concentration profile is known, the angles β, γ, δ, and ε are able to be adjusted to match the pollutant concentration profile. In some embodiments of the present invention, the angle of injection is manually adjusted. In other embodiments of the present invention, the angle of injection is adjusted by adjusting the amount and orientation of momentum-providing gas used to provide momentum to the injected slurry (explained below). In some embodiments of the present invention, the injectors 315 are coupled to the computer 321, the angle of the injection is controlled by the computer 321 and the system is automated. According to this embodiment, the measuring devices 320, 320', 325, 325' report to the computer 321 as the pollutant concentration profile of the boiler furnace 301 changes. The computer 321 couples this information to the injector and the angle of the injector 315 dynamically adjusts in real time, to match the pollutant concentration conditions of the boiler furnace 301. The angle can be adjusted using a stepper motor.

Figure 4:
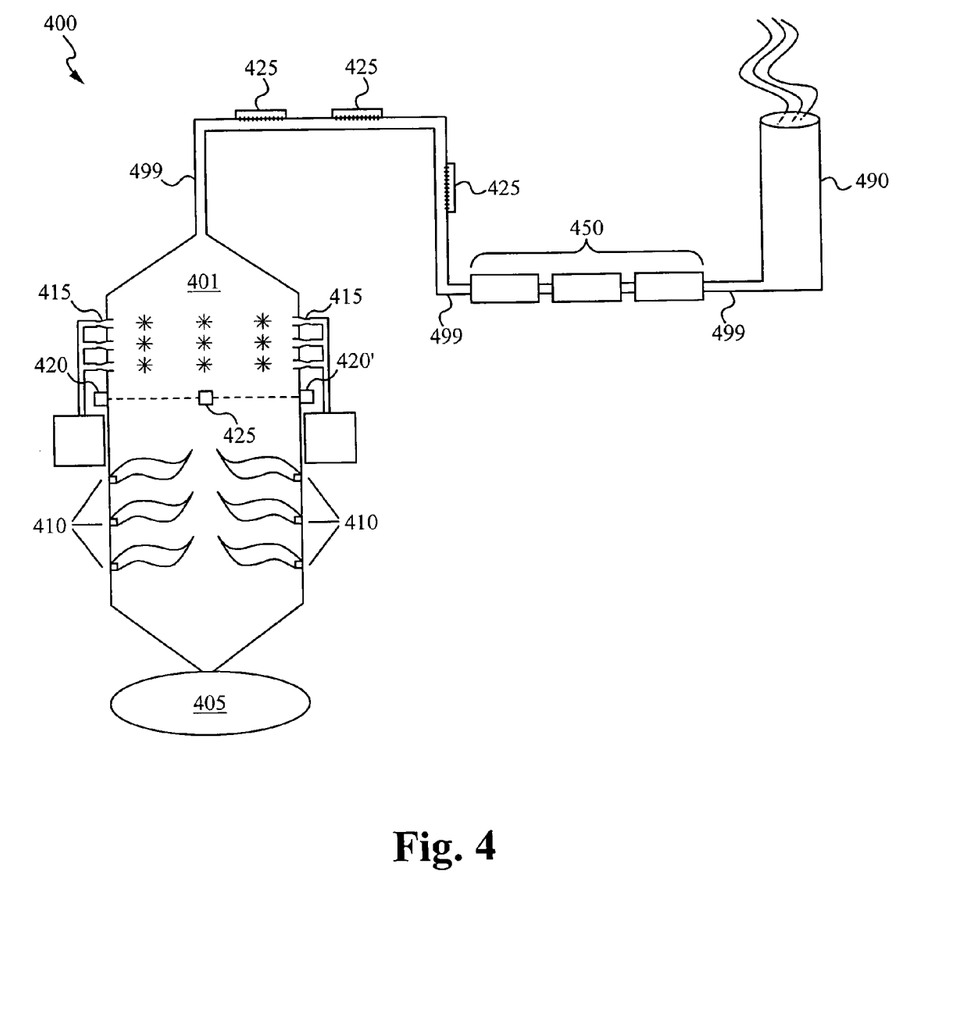
FIG. 4 illustrates a schematic side view of a boiler system having multiple levels of injectors according to some embodiments of the present invention.

An alternative method of delivering slurry to the appropriate regions of the boiler can be achieved by utilizing multiple injectors along the walls of the boiler furnace and choosing which injectors to fire based on a temperature and/or concentration profile. In some embodiments of the present invention, a matrix of injectors is utilized. FIG. 4 illustrates a side view of a boiler system 400 utilizing a matrix of injectors 415 to deliver slurry to the boiler furnace 401 at optimal locations to follow both a temperature profile and a pollutant concentration profile. The injectors 415 pointing into the page are represented by Asterisk symbols. Measuring devices 420, 420', 425 (and its counterpart, not shown) are situated at certain desirable locations around the boiler system 400 to provide temperature or pollutant concentration information. In some embodiments, the measuring devices 420, 420', 425 (and its counterpart, not shown) provide both a temperature profile and a pollutant concentration profile. According to the temperature and/or pollutant concentration profiles, certain injectors 415 are selected to inject slurry into the boiler furnace 401.

In some embodiments of the present invention, the injectors 415 are able to be tilted horizontally and vertically as explained above. Tilting the injectors 415 is one way to compensate for shifting temperature conditions of the flue gas as the boiler load changes. This arrangement is able to be utilized for both wall-fired units and tangentially fired units.

It is another object of the present invention to used momentum-providing gas to provide additional momentum to the additives, giving them the ability to reach all parts of the boiler furnace. As such, the additives are able to react with more pollutant in the flue gas, resulting in cleaner emissions from the boiler system. In some embodiments of the present invention, the momentum-providing gas is flue gas although any suitable gas may be used as momentum-providing gas. In some embodiments of the present invention, re-circulated flue gas is used as momentum-providing gas (discussed below).

Figure 5:
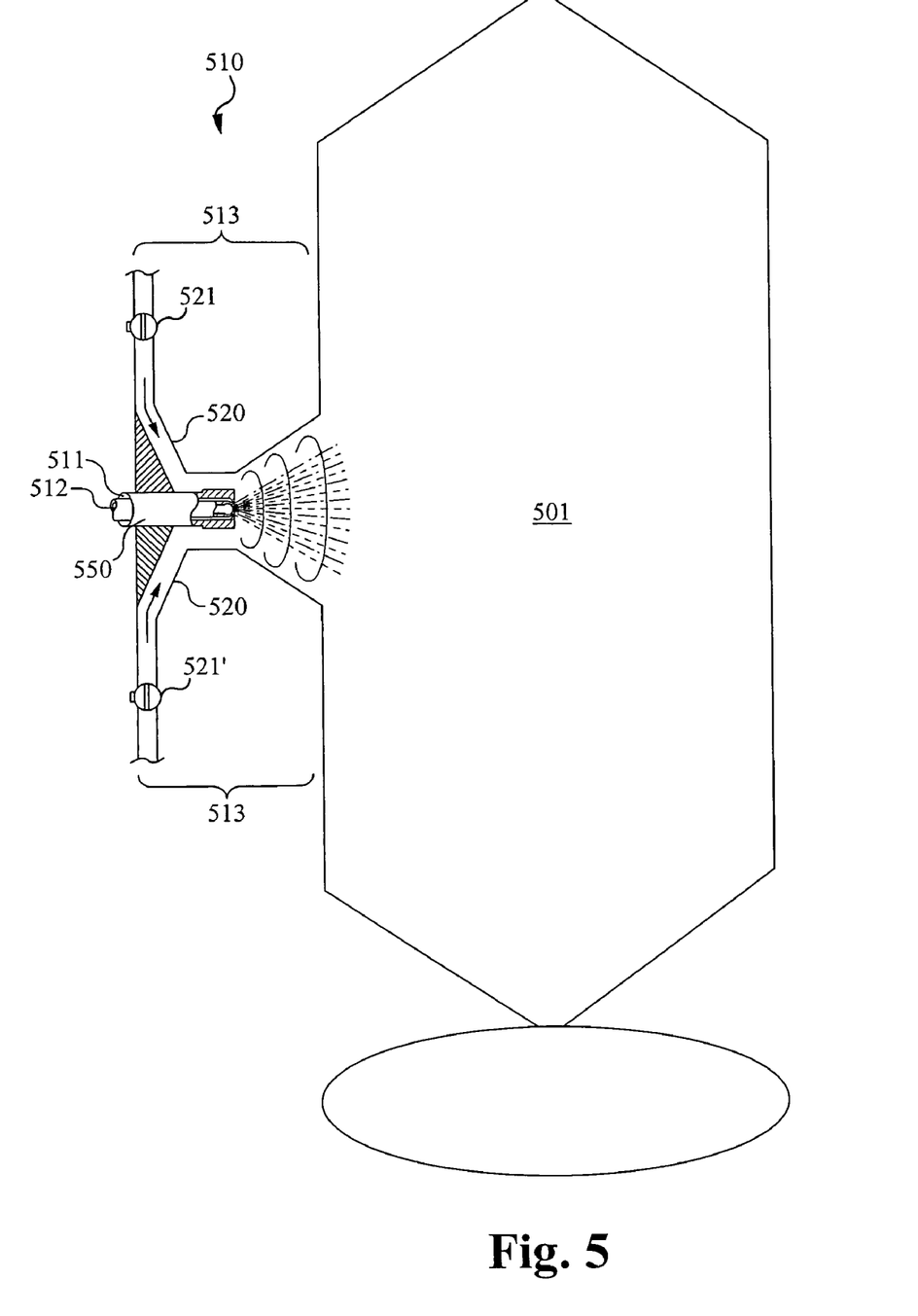
FIG. 5 illustrates a schematic view of an injector used to inject a slurry into a boiler furnace according to some embodiments of the present invention.

FIG. 5 illustrates an injection system 510 used to inject a slurry into a boiler furnace 501 according to some embodiments of the present invention. The injection system comprises an atomizer 550 which uses air from a conduit 511 to spray a slurry from a conduit 512 into the boiler furnace 501. Furthermore, the atomizer 550 is located in a register 513. As shown, the register 513 is a Venturi shaped register, however, it will be readily apparent to those having ordinary skill in the art that the register 513 can have many shapes and can take many orientations depending on design choices and other practical constraints. In the preferred embodiment of the present invention, the venturi-shaped register delivers a slurry and also obtains a flow rate measurement.

Momentum-providing gas is directed through the channel 520 toward the atomizer 550 (as indicated by arrows). In some embodiments of the present invention, the register 513 contains valves 521, 521' to regulate the flow the pressurized gas therethrough. It will be apparent to those ordinarily skilled in the art that valves 521, 521' can open from 0% to 100%. In some embodiments of the present invention, the valves 521, 521' are controlled manually. In other embodiments of the present invention the valves 521, 521' are automated and controlled pneumatically, electro-mechanically or by others means which will be readily known to those skilled in the art. In some embodiments of the present invention, the valve 521, 521' are coupled to a computer (not shown). According to these embodiments, the computer controls the amount of gas used to provide additional momentum to the slurry based on parameters supplied by a measurement such as a temperature profile or concentration profile.

It will be clear to those having ordinary skill in the art that the ability to individually control the pressure and amount of gas passing through the register 513 allows the momentum of the injected additives and the angle of injection of the additives to be controlled. Also, the pressure of the momentum-providing gas affects the size of the additive particles and the distribution of the additives.

Providing a jet of momentum-providing air to propel additives allows the additives to be injected further into the boiler furnace 501 and at a higher velocity. The additives will take less time to reach the regions of the boiler furnace 501 where the temperature is favorable for desired reactions, resulting in the enhanced removal of more pollutants. Also, the time the additives are exposed to the high temperatures is decreased, minimizing the amount of additives being melted before reacting with the pollutants.

Figure 6:
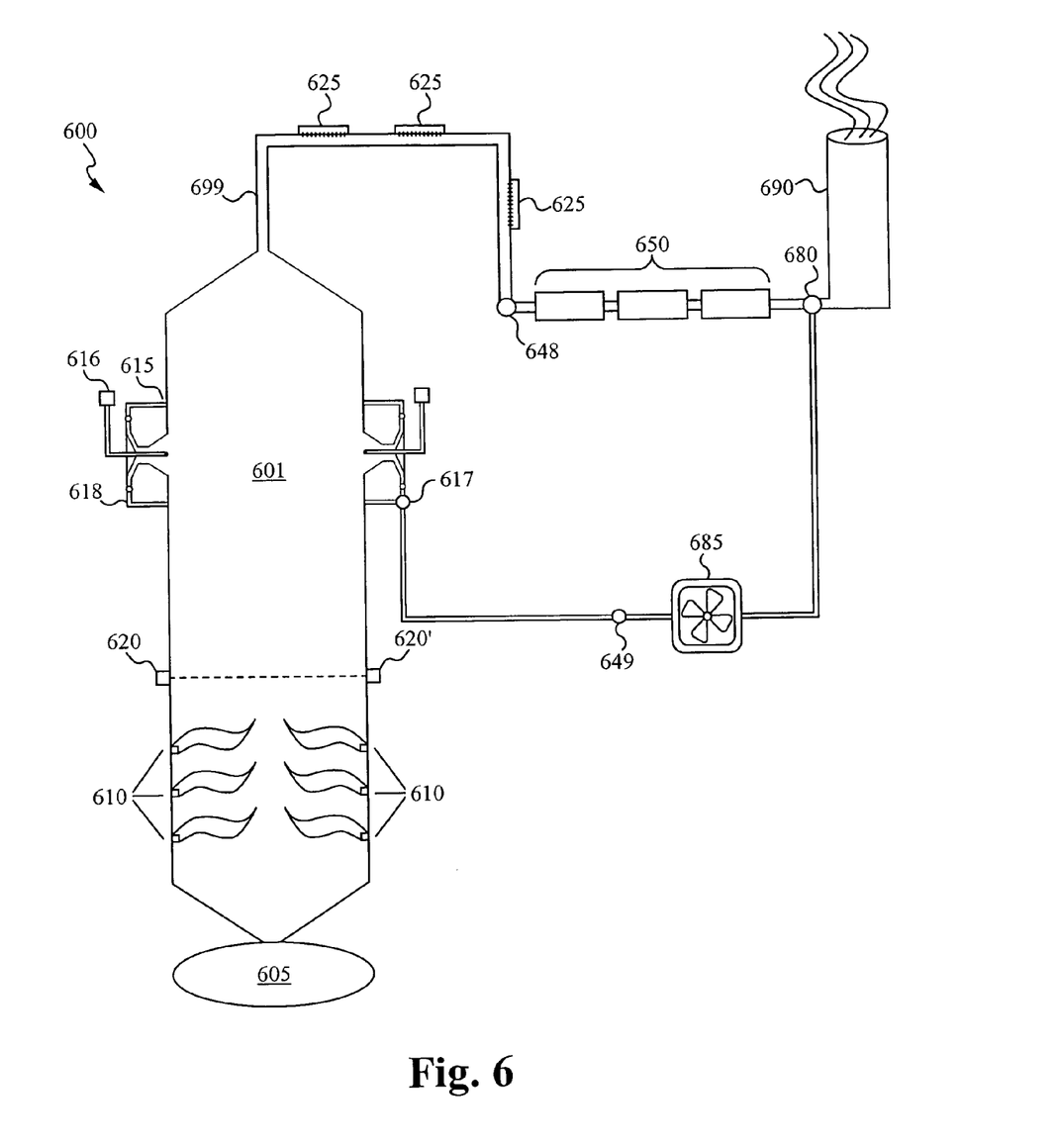
FIG. 6 illustrates a schematic view of an injection system used to inject a slurry into a boiler furnace utilizing re-circulated flue gas according to some embodiments of the present invention.

According to some embodiments of the present invention, the momentum-providing gas used to provide additional momentum to the additives is re-circulated flue gas, originating from the boiler furnace itself. FIG. 6 illustrates a boiler system 600 comprising a boiler furnace 601, burners 610, fuel source 605, measuring device 620, 620' and injectors 615 mounted in venturi shaped registers (not numbered), (as explained in FIG. 5). The boiler system 600 produces flue gas (not shown) with pollutants (not shown) by burning fuel from the fuel source 605. The injected slurry (not shown) reacts with the pollutants and the flue gas-slurry mixture is directed through the duct work 699. The flue gas-slurry mixture is directed past the heat transfer surfaces 625 and the node 648 to the particulate control devices 650. The particulate control devices 650 can include, but are not limited to bag houses, electrostatic precipitators, or the like. The particulate control devices 650 clean the flue gas and directs it towards the node 680 and the stack 690. Before reaching the stack 690, some portion of the cleaned flue gas is directed through the node 680. Preferably, a portion of flue gas ranging from 1% to 25% of the total volume of the flue gas is directed through the node 680, however, any other amount of flue gas is able to be passed through the node 680. The flue gas passing through the node 680 is pushed by a fan 685 past the node 649, to the node 617. In alternative embodiments of the present invention, the node 648 directs a portion of the flue gas to the node 649 and then to the node 617 using another fan (not shown). From the node 617, the flue gas is then re-circulated through the channels 618 to the venturi registers to provide additional momentum to the injected slurry (as explained in FIG. 5).

An additional advantage to this and other disclosed embodiments of the present invention is the small amount of power needed to run the recirculation system and to achieve results comparable to much more costly methods which consume much more power. Other technologies involve an expensive scrubber and a selective catalytic reduction apparatus. Such systems consume a significant portion of power to operate in comparison to the amount of power generated by the system. As such, traditional pollutant removal methods are parasitic in the sense that they consume an extensive amount of the very power the system is meant to produce. Such a method of reducing $SO_X$ and $NO_X$ emissions using scrubbers are energy wasteful and cause the system to produce significantly more $CO_2$ and greenhouse gas emissions due to its parasitic nature. In contrast, the disclosed method for reducing $SO_x$ and $NO_x$ emissions eliminates nearly the same amount of pollutant (50% or above) at a much smaller cost. In fact, experimental results have shown a reduction of 80% of pollutants. Furthermore, since the amount of power used to operate the disclosed invention is small in comparison to the amount of parasitic power used to operate the more expensive scrubbers, the disclosed method and apparatus emits less $CO_2$ and greenhouse gases in order to run the cleaning system.

Figure 7:
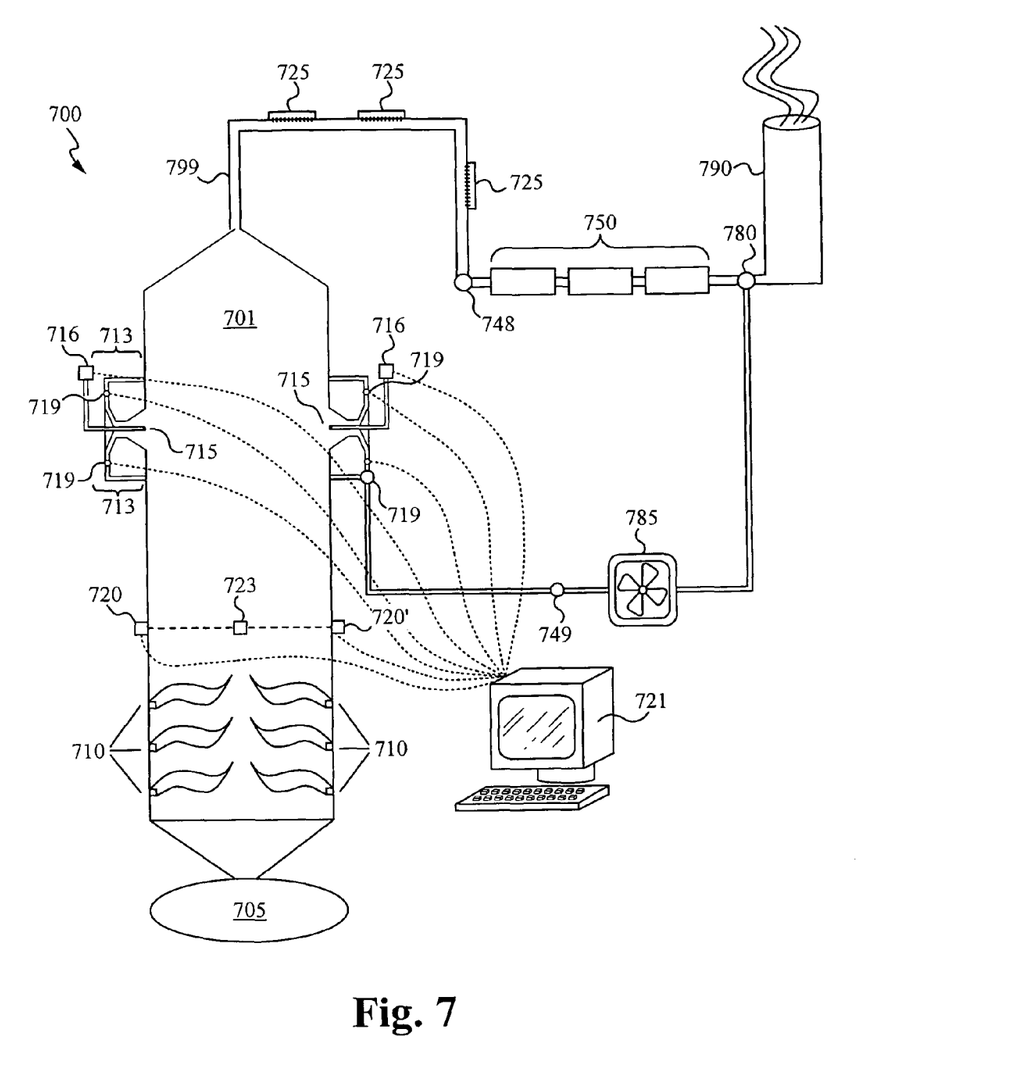
FIG. 7 illustrates a schematic view of a boiler system in which a computer dynamically adjusts the various components in order to optimize pollution reduction according to some embodiments of the present invention.

It is another object of the present invention to combine and automate the multiple novel apparatuses and methods disclosed herein. For example, FIG. 7 illustrates a boiler system 700 utilizing re-circulated flue gas to provide additional momentum to the additives injected through injectors 715. The injectors 715 are coupled to a slurry source 716. The slurry source 716 is coupled to a computer 721 and the computer 721 is able to adjust the flow rate of the slurry. The injectors 715 are located in venturi shaped registers (not numbered) having channels (not numbered). The channels contain valves 719 for controlling the amount of momentum-providing gas that is able to pass through the valves 719. The valves 719 are coupled to the computer 721 and is the computer 721 is able to control the valves 719. Adjusting the valves 719 allows the computer 721 to adjust the angle of slurry injection from the injectors 715.

Multiple lasers 720, 720', 723 and its partnering device (not shown) are utilized to provide both temperature and concentration profiles of the boiler furnace 701. The lasers 720, 720', 723 and its partnering device are coupled to the computer 721. The computer 721 receives and analyzes the temperature and concentration information dynamically and in real time.

The computer 721 analyzes the temperature and concentration information and determines how the injection of slurry and the concentration of slurry may be adjusted to optimize the reduction of pollutants in the flue gas. The computer is able to dynamically adjust the angles of injection of slurry or the slurry flow rate by adjusting the individual valves 721 in the channels. The computer is also coupled to a node 717. In some embodiments of the present invention, the node 717 is able to control the pressure of the re-circulated flue gas entering the register 713. In some embodiments of the present invention, multiple levels of injectors 715 are utilized. According to these embodiments, the injectors 715 are coupled to the computer 721 and the computer 721 controls which injectors 715 inject slurry based on the temperature and concentration profiles.

The present invention solves a need in the present state of the art to determine the optimal locations to inject sorbent into a boiler system, to provide the sorbent adequate momentum in order to reach the desired injection points, and to adjust the injection of sorbent based on the profile of the boiler system to optimize the reduction of pollutant output. The present invention eliminates pollutants at a very small cost and while consuming a very small amount of power. As such, the amount of pollutant emitted from the boiler is decreased and less power is wasted on running parasitic cleaning systems.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications can be made in the embodiment chosen for illustration without departing from the spirit and scope of the invention. Specifically, it will be apparent to one of ordinary skill in the art that the device and method of the present invention could be implemented in several different ways and have several different appearances.

What is claimed is:

1. A boiler furnace system and pollutant reduction apparatus comprising:
   a. a fuel source;
   b. a boiler furnace having at least one wall, wherein the boiler furnace comprises a combustion chamber, wherein the combustion chamber burns fuel from the fuel source, creating flue gas containing at least one pollutant;
   c. at least one measurement device located within the combustion chamber;
   d. at least one register located on the at least one wall of the combustion chamber, wherein the register comprises:
      i. at least one injector located the register for the injection of a slurry suspension into the combustion chamber, wherein the slurry suspension reacts with the at least one pollutant, forming flue gas with additional particulates, wherein the slurry containing a sorbent and a liquid; and
      ii. at least one opening to accommodate an injector, wherein the at least one opening is configured to carry momentum-providing gas such that the momentum-providing gas is capable of manipulates the flow rate of slurry suspension injected into the combustion chamber;
   e. a computer controlled slurry injection system capable of determining a slurry injection angle by a computer based on a real time temperature profile of the furnace, such that the slurry suspension is able to reach a computer determined injection location while remaining in a pre-determined temperature range;
   f. first duct work configured to carry the flue gas out of the combustion chamber; and
   g. at least one particulate control device located downstream from the boiler, wherein the first duct work delivers the flue gas with additional particulates to the at least one particulate control device, wherein the at least one particulate control device removes particulates from the flue gas with particulates, forming cleaned flue gas.

2. The boiler furnace system and pollutant reduction apparatus according to claim 1, wherein the fuel source is selected from among a solid fuel source, a liquid fuel source, a gaseous fuel source and a combination of fuel in a combination of one or more phases.

3. The boiler furnace system and pollutant reduction apparatus according to claim 1, wherein the fuel source is a carbon-containing fuel source.

4. The boiler furnace system and pollutant reduction apparatus according to claim 1, wherein the fuel source is municipal solid waste.

5. The boiler furnace system and pollutant reduction apparatus according to claim 1, further comprising:
   a. a fan for forcing cleaned flue gas; and
   b. at least one re-circulation duct, wherein the fan forces cleaned flue gas through the re-circulation duct to the at least one opening, such that cleaned flue gas is used as momentum-providing gas such that the momentum-providing gas manipulates the injection of slurry suspension into the combustion chamber.

6. The boiler furnace system and pollutant reduction apparatus according to claim 1, wherein the at least one measurement device comprises a laser measurement device.

7. The boiler furnace system and pollutant reduction apparatus according to claim 1, further comprising multiple measurement devices located within the combustion chamber.

8. The boiler furnace system and pollutant reduction apparatus according to claim 1, further comprising multiple registers located on the at least one wall of the combustion chamber.

9. The boiler furnace system and pollutant reduction apparatus according to claim 1, further comprising at least one valve in the at least one opening, wherein the valve controls the amount of momentum-providing gas able to pass therethrough.

10. The boiler furnace system and pollutant reduction apparatus according to claim 1 further comprising a computer, wherein the computer is coupled to the at least one measurement device.

11. The boiler furnace system and pollutant reduction apparatus according to claim 1 further comprising a computer, wherein the computer is coupled to the at least one injector.

12. The boiler furnace system and pollutant reduction apparatus according to claim 1 further comprising a computer, wherein the computer is coupled to at least one valve.

13. A method of reducing pollutant output in a boiler furnace system, the method comprising:
   a. providing a slurry suspension comprising a flue gas treatment substance, wherein the flue gas treatment substance contains a sorbent and a liquid;
   b. determining a slurry injection angle by a computer based on a real time temperature profile of the furnace, such that the slurry suspension is able to reach a computer determined injection location while remaining in a predetermined temperature range; and
   c. injecting the slurry suspension into a combustion chamber of a boiler furnace.

14. A method of reducing pollutant output in a boiler furnace system, the method comprising:
   a. providing a slurry suspension comprising a sorbent and a liquid, wherein the sorbent is chosen for its tendency to react with a pollutant, wherein the slurry comprises a flue gas treatment substance;
   b. determining a slurry injection angle by a computer based on a real time temperature profile of the furnace, such that the slurry suspension is able to reach a computer determined injection location while remaining in a predetermined temperature range;
   c. injecting the slurry suspension into a combustion chamber of a boiler through at least one injector, wherein the combustion chamber contains a flue gas with a distribution of pollutants across the furnace, and wherein at least a portion of the sorbent reacts with the pollutants, thereby forming particulates within a flue gas-particulate mixture; and
   d. delivering the flue gas-particulate mixture to particulate control devices, wherein the particulate control devices remove particulates from the flue gas-particulate mixture.

15. The method of reducing pollutant output in a boiler furnace system according to claim 14, wherein the step of injecting a slurry suspension further comprises obtaining at least one system profile measurement of the boiler.

16. The method of reducing pollutant output in a boiler furnace system according to claim 15, further comprising adjusting the injection of slurry suspension into the combustion chamber based on the at least one system profile measurement such that the efficiency of reactions between the slurry suspension and pollutants in the flue gas is increased.

17. The method of reducing pollutant output in a boiler furnace system according to claim 16, wherein the step of adjusting the injection of slurry suspension comprises adjusting the flow rate of the slurry suspension.

18. The method of reducing pollutant output in a boiler furnace system according to claim 16, wherein the step of adjusting the injection of slurry suspension comprises adjusting the location of injection of the slurry suspension.

19. The method of reducing pollutant output in a boiler furnace system according to claim 14, wherein the step of injecting slurry suspension comprises delivering slurry suspension to the boiler furnace through an atomizer.

20. The method of reducing pollutant output in a boiler furnace system according to claim 14, the method further comprising adjusting the vertical angle of injection of the slurry suspension into the combustion chamber.

21. The method of reducing pollutant output in a boiler furnace system according to claim 14, the method further comprising adjusting the horizontal angle of injection of the slurry suspension into the combustion chamber.

22. The method of reducing pollutant output in a boiler furnace system according to claim 14, wherein the slurry suspension comprises a suspension of a liquid and a calcium-based sorbent.

23. The method of reducing pollutant output in a boiler furnace system according to claim 14, wherein the slurry suspension comprises a suspension of a liquid and a magnesium-based sorbent.

24. The method of reducing pollutant output in a boiler furnace system according to claim 14, wherein the slurry suspension comprises a suspension of sorbent and a solution of urea.

25. The method of reducing pollutant output in a boiler furnace system according to claim 14, wherein the slurry suspension comprises urea water solution.

26. The method of reducing pollutant output in a boiler furnace system according to claim 14, wherein the slurry suspension comprises a suspension of sorbent in a liquid and a portion of surfactants.

27. The method of reducing pollutant output in a boiler furnace system according to claim 14, further comprising changing the amount of the slurry suspension that is injected into the combustion chamber by increasing or decreasing the pressure of a momentum-providing gas.

28. The method of reducing pollutant output in a boiler furnace system according to claim 14, wherein the step of injecting slurry suspension comprises injecting slurry suspension into the flue gas using more than one injector, wherein each of the more than one injector is configured to either inject slurry suspension or to not inject slurry suspension and, wherein an angle of each individual injector of the multiple injectors is independently controllable.

29. The method of reducing pollutant output in a boiler furnace system according to claim 28, wherein the boiler furnace system is configured such that an individual injector from among the more than one injector is able to be located at more than one planar level of the boiler furnace.

30. The method of reducing pollutant output in a boiler furnace system according to claim 15, wherein the flow rate of the slurry suspension through each individual injector is controlled according to the at least one system profile measurement of the combustion chamber.

31. The method of reducing pollutant output in a boiler furnace system according to claim 14, the method further comprising:
   a. providing a register in the boiler furnace wall, wherein the register has at least one channel for the introduction of a momentum-providing gas through the register;

b. positioning the at least one injector through at least one of the channel and a discharging opening of the register; and c. providing additional momentum to the slurry suspension injected into flue gas by forcing the momentum-providing gas through the at least one channel.

32. The method of reducing pollutant output in a boiler system furnace according to claim 31, the method further comprising:

a. generating re-circulated flue gas in a boiler system; and b. using the re-circulated flue gas as momentum-providing gas.

33. The method of reducing pollutant output in a boiler furnace system according to claim 32, the method further comprising cleaning the re-circulated flue gas of pollutants before being used as momentum-providing gas.

34. The method of reducing pollutant output in a boiler furnace system according to claim 31, wherein the register is venturi-shaped.

35. The method of reducing pollutant output in a boiler furnace system according to claim 31, wherein the register is flexible and is able to change the direction of injection, wherein the direction of injection is able to be changed vertically and horizontally.

36. The method of reducing pollutant output in a boiler furnace system according to claim 31, the method further comprising controlling the ability of momentum-providing gas able to pass through the channels, wherein at least one valve is positioned in the register, and wherein the valve controls a flow of momentum-providing gas therethrough.

37. The method of reducing pollutant output in a boiler furnace system according to claim 15, the method further comprising using a measuring device coupled to a computer to obtain the at least one system profile measurement of the combustion chamber.

38. The method of reducing pollutant output in a boiler furnace system according to claim 14, the method further comprising using a laser coupled to a computer and laser spectroscopy computation to obtain the at least one system profile measurement of the combustion chamber.

39. The method of reducing pollutant output in a boiler furnace system according to claim 14, wherein the at least one system profile measurement is selected from among a temperature profile, a flue gas velocity profile and a measurement of the level of pollutants in the boiler system.

40. The method of reducing pollutant output in a boiler furnace system according to claim 14, wherein the pollutants present in the flue gas containing pollutants in substantially comprised of oxides of sulfur.

41. The method of reducing pollutant output in a boiler furnace system according to claim 14, wherein the pollutants present in the flue comprises oxides of nitrogen.

42. The method of reducing pollutant output in a boiler furnace system according to claim 37, wherein the step of injecting the slurry suspension further comprises:

a. coupling the at least one injector to the computer, wherein the injection of the slurry suspension is able to be controlled by the computer;

b. controlling the injection of slurry suspension by the at least one injector with the computer; and c. dynamically adjusting the injection of slurry suspension based on the system profile measurement obtained by the computer.

43. The method of reducing pollutant output in a boiler furnace system according to claim 42, wherein the step of dynamically adjusting the injection of slurry suspension further comprises optimizing the injection of slurry suspension into the combustion chamber such that the efficiency of reactions between the slurry suspension and pollutants in the flue gas is maximized.

44. The method of reducing pollutant output in a boiler furnace system according to claim 14, wherein the step of delivering the flue gas-particulate mixture to particulate control devices forms a cleaned gas, and wherein the method further comprises delivering the cleaned gas to a scrubber to further clean the cleaned gas.

45. A method of automating the optimization of the reduction of pollutants in a boiler furnace system, the method comprising:

a. forming a slurry suspension by combining a sorbent and a liquid, the slurry suspension having a concentration ratio of the sorbent and the liquid, wherein the sorbent is chosen for its tendency to react with a pollutant, and wherein the concentration ratio is controllable by a computer;

b. positioning at least one injector within at least one wall of a combustion chamber of a boiler system, wherein the at least one injector is positioned within a register for the introduction of momentum-providing gas into the combustion chamber, wherein at least one valve is positioned within the register, wherein the at least one valve controls the introduction of momentum-providing gas into the combustion chamber, wherein the at least one injector is coupled to the computer, and wherein the at least one valve is controllable by the computer;

c. injecting the slurry suspension into the combustion chamber through the at least one injector, forming injected slurry suspension having a first flow rate;

d. obtaining a system profile measurement of the combustion chamber, wherein a measuring device is positioned within combustion chamber of the boiler, and wherein the measuring device is coupled to a computer;

e. forcing momentum-providing gas through the register, wherein the momentum-providing gas alters the first flow rate of the injected slurry suspension, resulting in a second flow rate;

f. determining optimal concentration ratio of the slurry suspension to most effectively react with a pollutant with the computer based on a system profile measurement; and g. determining a slurry injection angle by a computer based on a real time temperature profile of the furnace, such that the slurry suspension is able to reach a computer determined injection location while remaining in a predetermined temperature range.

* * * * *